INVENTOR.
Will R. Stephens

United States Patent Office 2,997,373
Patented Aug. 22, 1961

2,997,373
DISSOLVING APPARATUS
Will R. Stephens, Cedar Rapids, Iowa, assignor to Barnard & Leas Manufacturing Company, Inc., Cedar Rapids, Iowa
Filed Jan. 19, 1959, Ser. No. 787,741
4 Claims. (Cl. 23—272.6)

This invention is in the field of unit operations and it relates more particularly to chemical process equipment for commercial use in effecting rapid and complete solubilization of materials in a liquid system.

It is an object of this invention to provide a new and improved piece of equipment for chemical processes wherein a material is to be taken into solution in a liquid system and it relates more particularly to equipment which is adapted for achieving rapid and complete solubilization of a solid in a liquid system; which is simple in construction and efficient in operation; which effects solution at a faster rate than equipment now in use for similar purposes; which provides homogenization for uniform distribution of the material in solution concurrently with the solubilization thereof; which achieves solubilization without entrainment of foreign materials such as air in foaming or the like, and which can be loaded and unloaded in a simple and efficient manner with suitable means for controlling the concentration of the materials in solution.

These and other objects and advantages of this invention will hereinafter appear and, for purposes of illustration, but not of limitation, an embodiment of the invention is shown in the accompanying drawing, in which—

Figure 1:
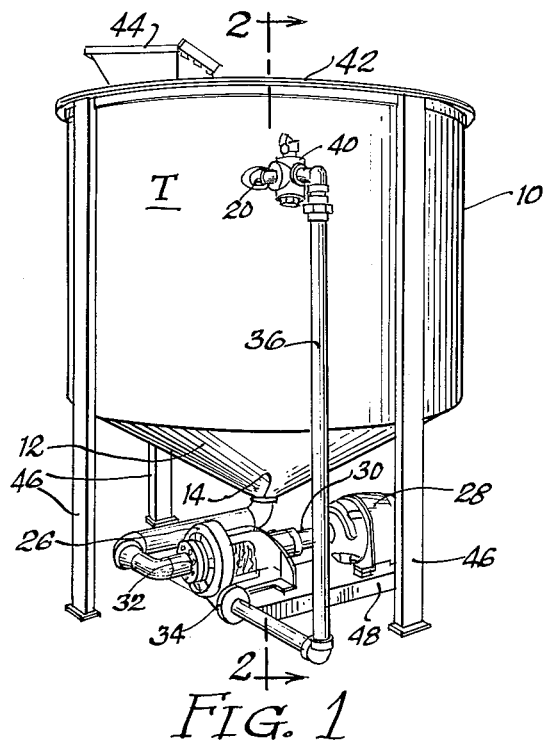
FIGURE 1 is a perspective view of a solubilizer embodying the features of this invention.
Figure 2:
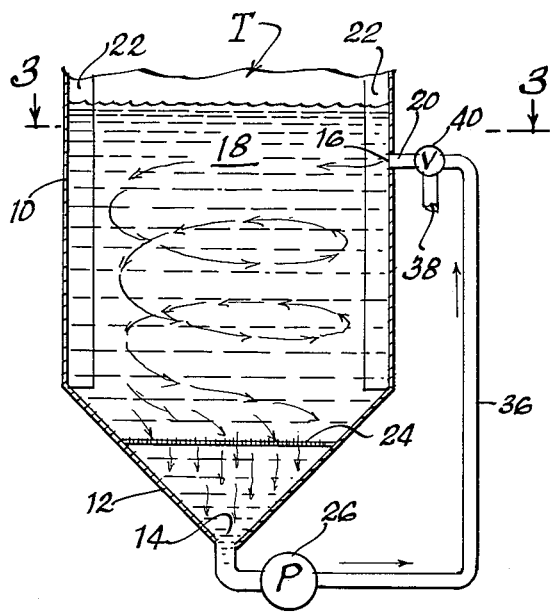
FIGURE 2 is a sectional view of the interior of the solubilizer taken substantially along the line 2—2 of FIGURE 1.
Figure 3:
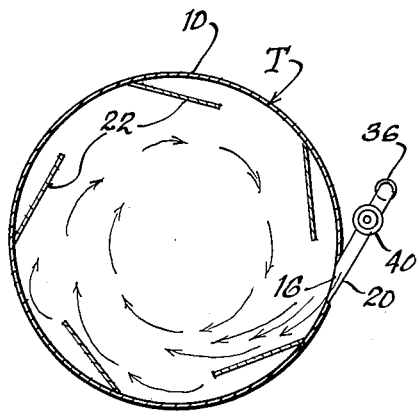
FIGURE 3 is a sectional view taken along the line 3—3 of FIGURE 2.

In the process industries, solution has been effected by the addition of the material to be dissolved to the liquid housed in a large vat or mixing tank. The liquid is agitated as the material is added or afterwards as by means of a stirrer which extends angularly downwardly into the bottom of the tank to provide a type of directed circulation coupled with agitation. This type of mixing action for solution is subject to a number of criticisms such as (1) dead areas within the corners of the tank wherein solute can become entrapped to avoid solution and wherein liquid can become segregated to avoid admixture thereby to produce a non-uniform system, and (2) a low rate of solution is secured whereby the time required per batch becomes excessive.

In accordance with the practice of this invention, equipment is provided wherein such dead spots are completely avoided and the material is kept in a constant state of agitation and movement whereby a high rate of solution is effected to achieve solubilization in a fraction of the time required by previous equipment and wherein substantially complete and uniform distribution of the material dissolved is completely effected to produce a homogenized system.

Referring now to the drawing, the process equipment embodying the features of this invention comprises a tank T of large capacity formed of a cylindrical member 10 of large diameter which terminates in a bottom wall 12 of conical shape. The outlet 14 from the tank is at the apex at the bottom of the conical section and an inlet 16 is provided in the side wall of the cylindrical section 10 in a location between the top and bottom of the cylindrical section at a level adapted to be below the level of the liquid 18 within the tank.

The inlet is positioned to introduce liquid tangentially into the tank to create circulation of the liquid in one direction about the tank. For this purpose, the inlet 16 may be provided with a nozzle 20 for directing the liquid at high speed in the desired angular relation into the tank below the liquid level. The described circulatory movement can be achieved when the liquid is introduced at an angle approaching the tangent such as at an angle within the range of 30° to 0° from the tangent.

The tank is also provided with vertically disposed baffle plates 22 extending inwardly into the tank from circumferentially spaced apart portions of the side wall at an angle of about 25°±10° with the tangent or an angle of 65°±10° with the radius. The baffle plates extend from above the liquid level to about the base of the cylindrical section 10 and they are dimensioned to have a width which is from 1/10 to 1/40 the diameter of the tank. While the length of the baffle plates is not critical, it has been found that the angular relationship is of considerable importance since an increase in the angle above 35° with the tangent will result in the development of increasing amounts of undesirable eddy currents within the tank while an angular relationship of less than 15° with the tangent will minimize the effect of the baffle plates in effecting solution.

Across the bottom of the tank in an intermediate portion of the conical section 12 there is provided a foraminous separating wall 24 through which the liquid may flow. It is desirable to locate the foraminous separating wall below and in spaced relationship from the bottom of the baffle plates. If the foraminous separating wall is located adjacent the bottom of the baffle plates or at the base of the conical section, a swirling action is generated in the conical section during operation whereby air is drawn down into the liquid and into the circulating and mixing means to interfere with the operation of equipment and cause foaming of the liquids. Location of the foraminous member 24 in an intermediate portion of the conical section operates to break up the air pockets and swirling action to the extent that smooth and efficient liquid movement is achieved for more complete and more rapid solution of materials.

An impeller type pump 26 is interposed in the line communicating the outlet 14 with the inlet 16 to circulate liquid from the bottom of the tank to the inlet. The pump 26 is adapted to be operated by an electrical motor 28 or other power operating means connected by shaft 30 to the impeller rotatably mounted within the housing having a central inlet 32 communicating with the outlet 14 and a peripheral outlet 34 communicating with the inlet 16. The open type impeller pump operates not only to effect movement of the liquid from the outlet to the inlet but it provides a type of grinding action which functions in shear to enhance solution, especially where smaller amounts of material are being incorporated into the liquid. Under such circumstances, it functions in the manner of a grinder to work the material into the solution as it passes therethrough.

The piping 36 between the pump 26 and the inlet 16 is provided with a by-pass 38 and a valve 40 adjustable to communicate the outlet from the pump with the inlet to the tank or alternatively with the by-pass 38 for the delivery of liquid as product to storage or use.

The tank may be provided with a cover 42. In the illustrated modification, it is also provided with a hopper 44 in communication with the upper end of the tank for delivery of a measured amount of powder, pellets, solids or other material to the tank, either en masse or at a predetermined measurable rate for solution.

By way of illustration, in a commercial unit for use in processing a 5-ton batch of fertilizer liquid into which soluble potash or calcium chloride is dissolved, the tank, supported on legs 46, is dimensioned to have an inside diameter of about 80 inches and a height of about 75 inches with the inlet 16 located about 18 inches from the top of the tank. The vertically disposed baffle plates 22 are arranged in circumferentially spaced apart relation about the cylindrical portion 10 of the tank and they are dimensioned to have a width of about 2–3 inches and they are positioned at an angle of about 30° with the tangent or 60° with the radius.

The foraminous separating plate 24 spans the conical section 12 about midway between the base of the cylindrical portion and the apex. The impeller pump 26 is selected to have a rate of about 300 gallons per minute and is driven by an electrical motor 28 mounted with the pump on a suitable platform 48.

The introduction of the recirculated liquid into the tank provides for turbulent action in tangential flow which prevents localization. This coupled with the downflow of liquid through the tank and through the conically shaped hopper portion insures complete mixing action of all of the materials to expose all of the solids for solution coupled with the action for uniform distribution and homogenization.

In the construction described, solution of fertilizer solids, such as calcium chloride, in amounts necessary to make up a prescribed formulation, can be achieved with uniform distribution and homogenization in less than 5 minutes time whereas solution of the same amount of materials with unequal distribution takes about 25 minutes with a conventional tank embodying a mixer within the tank for agitation.

It will be understood that changes may be made in the details of construction, arrangement and operation without departing from the spirit of the invention, especially as defined in the following claims.

I claim:

1. Process apparatus for taking materials into solution comprising a tank formed of a cylindrical housing of substantial dimension and a conically shaped lower end portion having its apex at the bottom, an outlet at the apex at the bottom of the conically shaped portion, an inlet in the side wall of the cylindrical housing intermediate the upper and lower edges and below the level of liquid in the tank and arranged to introduce liquid tangentially into the tank, means recirculating liquid from the outlet to the inlet, a plurality of axially disposed baffle plates extending inwardly from circumferentially spaced apart portions of the side wall of the cylindrical housing in the tangential direction in which the liquid is introduced into the tank from the inlets at an angle of 15° to 35° with a tangent originating from the point said baffles join with said housing and dimensioned to extend into the tank for a distance corresponding to $\frac{1}{10}$ to $\frac{1}{40}$ the diameter of the housing, and a foraminous plate extending across an intermediate portion of the conical section and below the baffle plates.

2. Process equipment as claimed in claim 1 in which the means recirculating the liquid from the outlet to the inlet comprises an impeller pump having its inlet communicating with the outlet of the tank and its outlet communicating with the inlet to the tank.

3. Process equipment as claimed in claim 1 in which the baffle plates extend through the length of the cylindrical housing.

4. Process equipment as claimed in claim 1 which includes means for introducing material to be dissolved in the liquid through the top of the tank.

References Cited in the file of this patent
UNITED STATES PATENTS

| | | |
|---|---|---|
| 491,370 | McCarty | Feb. 7, 1893 |
| 1,160,848 | Conklin | Nov. 16, 1915 |
| 2,201,212 | Valentine | May 21, 1940 |
| 2,528,094 | Walker | Oct. 31, 1950 |